Sept. 25, 1973   F. W. BRUNNER   3,761,290
FOOD COOKING APPARATUS
Filed Feb. 17, 1971   3 Sheets-Sheet 1

United States Patent Office 3,761,290
Patented Sept. 25, 1973

3,761,290
FOOD COOKING APPARATUS
Fred William Brunner, Eugene, Oreg., assignor to
Manning's Inc., San Francisco, Calif.
Filed Feb. 17, 1971, Ser. No. 116,295
Int. Cl. A47j 27/21
U.S. Cl. 99—330                                     8 Claims

ABSTRACT OF THE DISCLOSURE

An apparatus for cooking food, especially meatballs and the like on a continuous basis is disclosed. The food products, say meatballs, are progressively transported through a processing vessel located within a rectangular tank by means of transverse paddles connected to an endless conveyor device mounted in the processing vessel. The processing vessel contains water at, say, 180° to 200° F. in which the meatballs are immersed during their passage through the vessel whereby the meatballs are cooked under gentle conditions that do not disrupt them. Provision is made to remove from the processing vessel fat formed during the cooking. The cooking apparatus may be used in conjunction with a convenient packaging device that is also described.

---

This invention relates to a food cooking apparatus and, more particularly, to an apparatus for cooking food items on a continuous basis in heated water.

In the food industry there is a trend towards convenience foods of all types with the foods being fully prepared in a factory and shipped to the consumer for heating and serving. Even in large institutions such as schools, universities, hospitals, etc., there has been a marked trend in recent years to having foods prepared outside the institution in a factory and shipped to the institution frozen and ready for heating and serving directly without large amounts of preparation in the institution itself.

One of the many products being prepared in this manner are meatballs which are served with spaghetti, sauces, etc. Meatballs can be cooked by a number of different techniques but to avoid shrinkage they are preferably cooked in water. This is normally done in water at a temperature of about 180–200° F.

Meatballs have normally been prepared in a batch cooker in which the meatballs are placed in the hot water and allowed to remain until cooked and then the cooked meatballs are manually scooped out of the water. This procedure has a high labour requirement and there was the additional problem that during cooking, fat tended to collect on the surface of the water and in order to produce a high quality product it was necessary to remove this collected fat before the next batch of meatballs was added to the water for cooking.

It is, therefore, the object of the present invention to provide a continuous cooker for meatballs and like food products which will avoid the above difficulties.

The cooker in accordance with this invention includes an elongated water reservoir, preferably of rectangular configuration with a floor, side walls, end walls and an open top. Means are provided for heating the water in this reservoir to a desired cooking temperature.

Within the open top of the water reservoir is positioned a removable processing vessel having side walls and a perforate bottom. This perforate bottom includes upwardly curving end portions forming the ends of the processing vessel. In operating position the perforate bottom of the processing vessel is spaced from the floor of the reservoir and the water in the reservoir maintains a water level within the processing vessel itself.

An endless conveyor device is mounted in the processing vessel and this is mounted on horizontal transverse axes adjacent the ends of the vessel so as to form a lower forward run and an upper return run. This conveyor includes transverse paddles or blades extending outwardly from endless support members with these paddles closely fitting within the processing vessel during the forward run of the conveyor such that the ends of the paddles are in close proximity with the side walls of the vessel and the outer horizontal edges of the paddles are in close proximity with the perforate bottom and perforate end portions.

The meatballs to be cooked are fed into the processing vessel at one end and are carried along in the hot water in the vessel by means of the lower forward run of the conveyor paddles. As the meatballs progress along the processing vessel they are cooked and when they reach the end of the vessel they are carried up the curved perforate end by the paddles and dumped out a chute.

In order to prevent a buildup of fat on the surface of the processing water, an outlet weir is provided at the water level. With this arrangement fresh water can either be intermittently or continuously added to the reservoir and this causes a flow of water at the water level over the weir and, since the fat has collected at the surface, this fat is effectively removed by the overflow.

The entire device is preferably fabricated from stainless steel sheeting with the paddles being in the form of stainless steel plates mounted at one edge to a pair of conveyor chains. These paddles are preferably perforated to improve water distribution throughout the processing vessel.

The invention is illustrated by the attached drawings in which.

Figure 1:
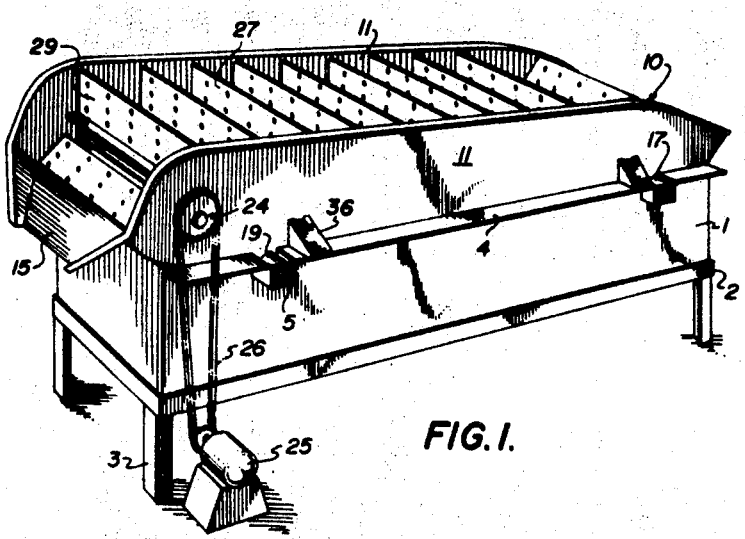
FIG. 1 is a perspective view of the cooker.
Figure 2:
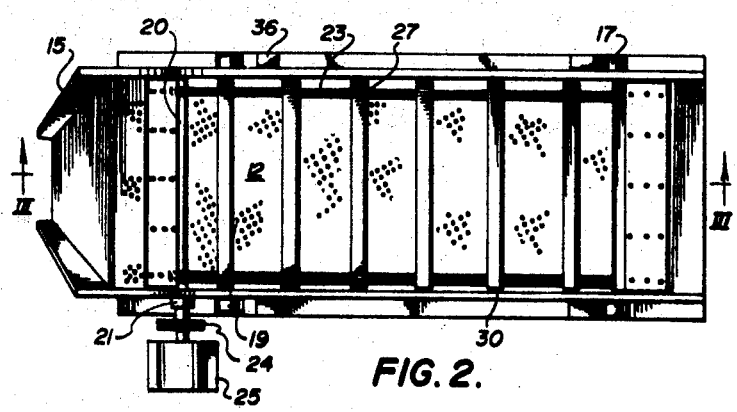
FIG. 2 is a top plan view of the cooker.

As will be seen from FIG. 1, the device essentially comprises a rectangular stainless steel tank 1 mounted on a steel frame 2. This steel frame 2 is carried by legs 3 which can be supported by wheels for easy movement about the factory.

The tank 1 includes outwardly extending flanges 4 at the top edges thereof and also includes recesses 5 in these flanges for receiving the ends of shafts.

For heating the water in the tank 1, steam coils 6 are provided at the bottom thereof and are connected to steam inlet line 8 passing through end wall 7 of the tank 1.

Resting in the tank 1 is processing vessel 10. This processing vessel has a pair of side walls 11 and welded to these side walls is a perforate bottom 12. Cleats 36 are fixed on side walls 11 and these cleats support vessel 10 on flanges 4 of tank 1. The perforate bottom 12 includes an upwardly curving inlet end portion 13 and an upwardly curving outlet portion 14. At the upper edge of the upwardly curving portion 14 is welded a stainless steel chute 15. To the upper edge of upwardly curving end portion 13 there is welded a stainless steel plate 35 which serves as an inlet chute for the meatballs being fed into the apparatus.

A stainless steel shaft 16 is mounted in bushings 17 in the side walls 11 of vessel 10 and a second stainless steel shaft 18 extends across the vessel 10 mounted in bushings 19 in side walls 11. A third stanless steel shaft 20 extends across between bushing 21 in side walls 11 and this shaft has toothed wheels 22 fixed thereon over which conveyor chains 23 pass. These chains 23 are driven by the toothed wheels 22 and travel over idler shafts 16 and 18 forming a travel path as can be seen from FIG. 3. The shaft 20 has mounted externally on one end thereof a toothed wheel 24 and this is driven from a variable speed motor 25 via chain drive 26.

Mounted on conveyor chain 23 are a series of spaced stainless steel paddles 27. These are bolted directly to the chains by way of right-angle flanges 28 so that the paddles 27 extend perpendicular from the chains 23. These paddles 27 are provided with holes 29 to aid water circulation.

Figure 3:
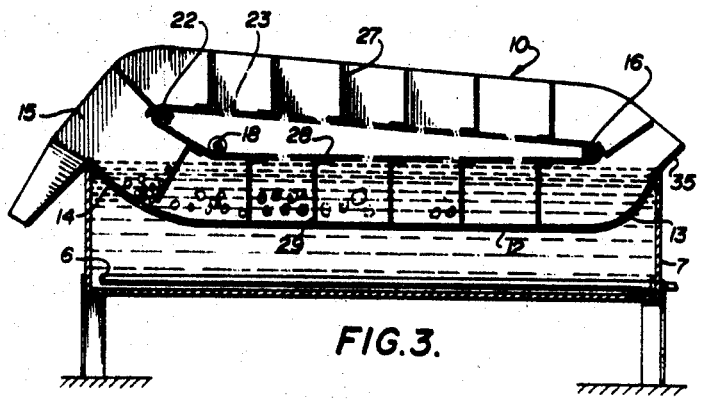
FIG. 3 is a sectional view along line IIII—III of FIG. 2.

As will be seen particularly from FIG. 3, the travel path of the conveyor and the shape of the perforated portions 12, 13 and 14 are arranged such that during the lower forward travel of the conveyor the paddles 27 have their outer edges 29 in close proximity with the surface of the perforated portions 12, 13 and 14. The ends 30 of the paddles 27 are also in close proximity with the side walls 11 so that the meatballs being fed into the vessel at inlet plate 35 are carried positively and progressively forward through the water to the outlet chute 15 at a uniform rate.

Attached to a side wall of tank 1 is a float tank 31. This float tank 31 is flow connected to tank 1 by upper connector pipe 33 and lower connector pipe 34. Water is supplied to float tank 31 by inlet pipe 38 and the water level within the tank is controlled by means of a float 31A and valve 31B. The side wall 11 of processing vessel 10 includes a perforated portion 32 which in operative position coincides with the end of upper connector pipe 33. This provides a direct flow connection between the float tank 31 and the interior of the processing vessel 10. The lower connector pipe 34 provides a direct flow connection between the float tank 31 and the lower portion of reservoir 1.

Figure 4:
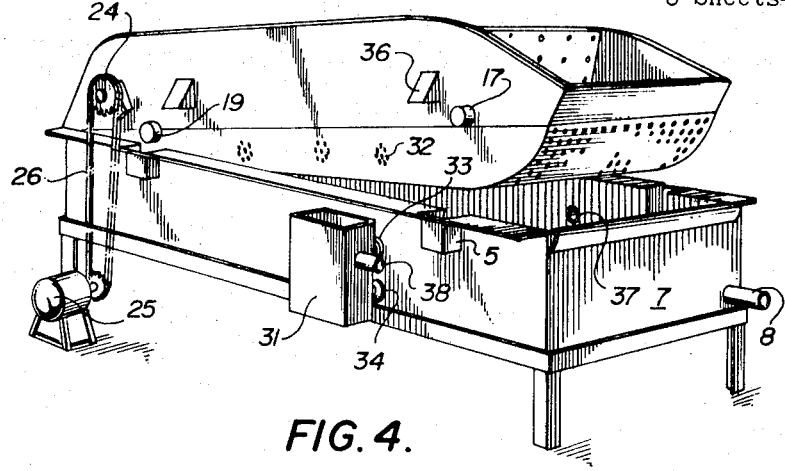
FIG. 4 is a perspective view showing the processing vessel tilted up out of the reservoir for cleaning.

On the opposite side wall of reservoir 1 is an outlet opening 37 to which is connected an outlet pipe. The adjacent side wall of processing vessel 10 contains a perforated portion identical to the perforated portion 32 illustrated in FIG. 4 which in operative position is in alignment with outlet 37 and provides a direct flow contact with the interior of processing vessel 10. This outlet opening 37 serves as a form of overflow weir which controls the water level in the processing vessel.

The float in the float tank 31 is adjusted so as to maintain within the float tank a water level slightly higher than the level which can be maintained by the outlet opening 37 so that there is a resultant very gentle flow of liquid out the outlet opening 37. Since the outlet opening 37 is in alignment with the surface of the liquid and any excess fat tends to float on the surface of the water, the result is that a great proportion of the fat which collects on the water drains off through the outlet 37. It is important to remove excess fat from the processing vessel since otherwise cooking is impeded, fat having a higher boiling point than water. Also, if much fat is present the meatballs tend to be cooked by a process akin to deep fat frying which gives the meatballs a different flavour, usually unattractive to the typical consumer, to meatballs cooked in boiling water. The fat recovered from the processing vessel may be used as the stock for soup, stew, gravy, sauce or the like.

Figure 5:
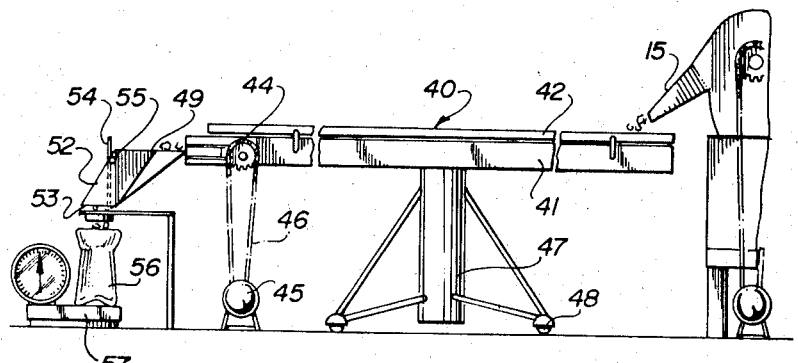
FIG. 5 is an elevation of an auxiliary device for collecting and packaging the cooked meatballs.
Figure 6:
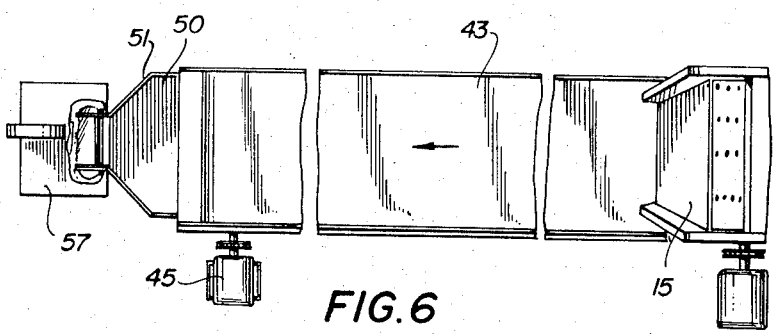
FIG. 6 is a plan view of the device shown in FIG. 5.
Figure 7:
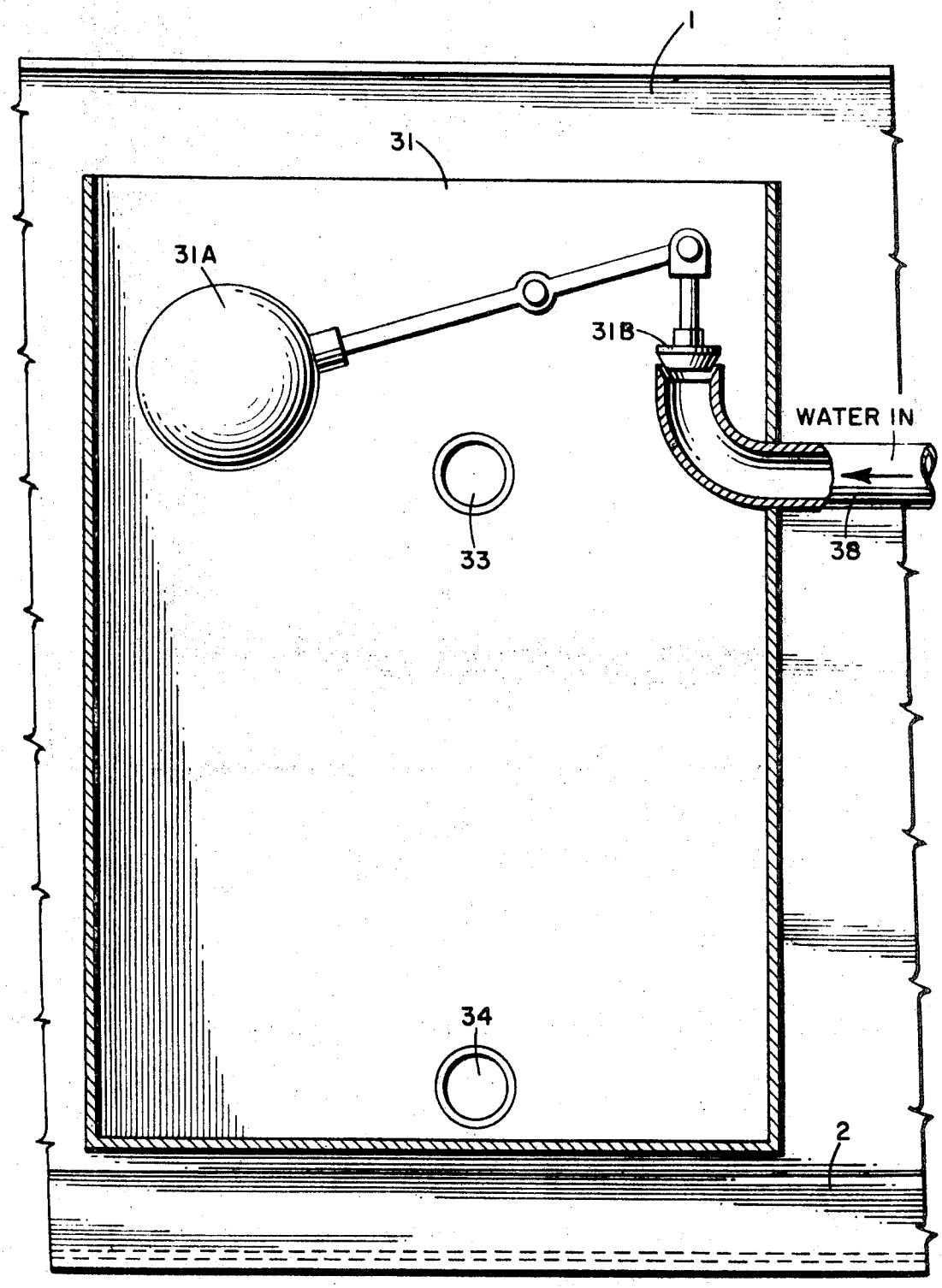
FIG. 7 is a cross-sectional view through the float tank 31 illustrating the float and valve for controlling the water level within the cooker.

The meatball cooker described above is preferably used in combination with the packaging device shown in FIGS. 5 and 6. This packaging device includes a conveyer table 40 comprising a table portion 41 with side guide walls 42 and an endless conveyor belt 43 mounted on rollers 44. This conveyor belt is driven by motor 45 and chain 46. The entire conveyor table is supported on a support stand 47 which is mounted on wheels 48 for easy movement about the factory.

At the end of the conveyor table 40 is mounted an enclosed chute 49 having a sloped bottom wall 50, side walls 51 and an outer wall 52, confirming a rectangular outlet 53. Within this outlet portion is mounted a closure plate 54 which is arranged to pivot on transverse pivot rod 55. In FIG. 5 the closure plate 54 is shown in the closed position while in open position, it is swung over adjacent end wall 52.

Directly beneath the outlet 53 is positioned a weighing device 57 and this supports a package 56, such as a plastic bag, for receiving the cooked meatballs.

With the meatball cooker and conveyor belt 43 in operation, the meatballs are continuously rolling down chute 15 and are carried along by conveyor belt 43 and dumped into the chute 49. With the closure plate 54 in the open position, the meatballs continue to fall down into container 56. When the container has reached a predetermined weight, the weighing device 57 actuates a device, e.g. an air cylinder, which swings the closure plate 54 to the closed position. This prevents any further flow of meatballs down the chute 49. With the chute closed, the filled package 56 is removed from the weighing device 57 and a fresh empty container is inserted in its place. The closure plate 54 is then once again opened manually and the meatballs containue to flow out of the outlet 53 into container 56 until it has also reached the predetermined weight at which time the reloading cycle is repeated.

The following example illustrates the manufacture of meatballs in the continuous cooker of this invention.

FORMULATION

| Ingredient: | Percent by weight |
| --- | --- |
| Ground beef | 48.42 |
| Ground veal | 11.93 |
| Ground pork | 11.93 |
| Bread crumbs | 2.81 |
| Milk | 17.07 |
| Margarine | 2.11 |
| Onions (reconstituted) | 0.93 |
| Eggs | 3.98 |
| Salt | 0.70 |
| Pepper | 0.03 |
| Spices | 0.09 |

PROCEDURE (i) The bread crumbs and the milk are combined and set aside for several minutes to permit absorption of the milk by the bread crumbs.

(ii) The onions and the margarine are sautéed, then cooled.

(iii) The eggs are beaten and the salt, pepper and spices added thereto.

(iv) All the ingredients are then combined together, thoroughly mixed and then roughly shaped into meatballs of approximately 1 ounce weight.

(v) The meatballs are introduced into the cooker through the inlet chute 35 whereupon they are immersed in water at a temperature of between about 180° to 200° F. (desirably the water should not be boiling). Contact with the water at this temperature, rapidly sets the shape of the meatballs which are then carried forward through the cooker at a uniform rate by the paddles 27. The speed of the motor during the conveyor chain is adjusted and set so that the internal temperature of the meatballs rises to about 175° F.

(vi) At the take-off end of the cooker, the cooked meatballs roll down the chute 15 and are carried along by conveyor belt 43, dumped into chute 49 and then packaged in plastic bags to a standard weight. The average weight of each cooked meatball is approximately ⅞ ounce compared to an uncooked weight of approximately 1 ounce so that there is a remarkably low shrinkage loss.

(vii) The packaged meatballs are then "quick frozen" in a form in which they are ready for heating and serving directly without large amounts of preparation.

It will be evident that the apparatus described in the foregoing is well adapted for use in the continuous cooking of food products other than meatballs such, for example, as dumplings. The rate of travel of the conveyor chain is adjusted through the variable speed motor to provide the residence time in the cooker that is necessary to cook a particular product. The apparatus lends itself to the maintenance of sanitary conditions, such as are important in the processing of food materials.

Although the invention has been described with reference to a specific embodiment thereof, this has been provided by way of illustrating and clarifying the invention only, and it is to be understood that the invention is in no sense limited thereto. Numerous modifications of the apparatus of the present invention within the spirit and scope of the invention as set forth in the appended claims will be apparent to those skilled in the art of automatic food processing.

What is claimed is:

1. A food cooking apparatus comprising:
   (a) an elongated reservoir having a floor, side walls, end walls and an open top;
   (b) means for maintaining a water level in said reservoir;
   (c) means for heating water in said reservoir;
   (d) a processing vessel having side walls and a perforate bottom, said bottom including upwardly curving end portions forming ends of the processing vessel and said vessel fitting within the open top of the reservoir such that the perforate bottom of the vessel is spaced from the bottom of the reservoir;
   (e) an endless conveyor device mounted in the processing vessel on horizontal transverse axes adjacent the ends of the vessel so as to form a lower forward run and an upper return run, said conveyor including transverse paddles extending outwardly from endless conveyor members with said paddles closely fitting within the processing vessel during the forward run, whereby unlocked food product, such as meatballs, when fed into the processing vessel, are carried along by the paddles while being cooked in water contained within the vessel and the cooked product are carried up a curved perforate end of the vessel and out of the vessel by the moving paddles.

2. A food cooking apparatus as claimed in claim 1, which includes means to remove fat from the processing vessel.

3. A food cooking apparatus as claimed in claim 1, in which a side wall of the reservoir includes an opening in alignment with as opening in the adjacent side wall of the processing vessel thereby providing a flow channel to control the water level in the processing vessel and to permit the egress of fat from the processing vessel.

4. A food cooking apparatus as claimed in claim 1, in which controlled amounts of water are supplied to the reservoir from a float tank outside the apparatus.

5. A food cooking apparatus as claimed in claim 1, in which controlled amounts of water are supplied to the reservoir from a float tank attached to a side wall of said reservoir and including a float and valve assembly, said float tank being flow connected with the reservoir by way of an upper and lower opening in a side wall thereof in alignment with a corresponding opening in the side wall of the processing vessel and reservoir respectively.

6. A food cooking apparatus as claimed in claim 1, in which the transverse paddles are perforated to facilitate circulation of the cooking water within the processing vessel.

7. A food cooking apparatus as claimed in claim 1, in which a plate is connected to the upwardly curving inlet portion of the perforate bottom to serve as an inlet chute for the product being fed into the apparatus.

8. A food cooking apparatus as claimed in claim 1, in which a chute is connected to the upwardly curving outlet portion of the perforate bottom through which the cooked product is discharged.

References Cited
UNITED STATES PATENTS

| | | | |
|---|---|---|---|
| 3,456,578 | 7/1969 | Pinsly | 99—355 X |
| 2,050,475 | 8/1936 | Sumner et al. | 99—404 X |
| 3,474,726 | 10/1969 | Curtin | 99—404 |
| 3,585,923 | 6/1971 | Waller | 99—404 X |

BILLY J. WILHITE, Primary Examiner

U.S. Cl. X.R.

99—356, 404, 408